(12) United States Patent
Battlogg

(10) Patent No.: US 7,497,142 B2
(45) Date of Patent: Mar. 3, 2009

(54) APPARATUS FOR THE RELATIVE ADJUSTMENT OF TWO PARTS

(75) Inventor: Stefan Battlogg, St. Anton im Montafon (AT)

(73) Assignee: Thyssenkrupp Presta AG, Eschen (LI)

( * ) Notice: Subject to any disclaimer, the term of this patent is extended or adjusted under 35 U.S.C. 154(b) by 175 days.

(21) Appl. No.: 11/445,583

(22) Filed: Jun. 2, 2006

(65) Prior Publication Data

US 2006/0272604 A1    Dec. 7, 2006

(30) Foreign Application Priority Data

Jun. 3, 2005    (EP) .................................. 05011993

(51) Int. Cl.
*B62D 1/18*    (2006.01)
(52) U.S. Cl. ....................................................... 74/493
(58) Field of Classification Search .................. 74/492, 74/493; 280/775
See application file for complete search history.

(56) References Cited

U.S. PATENT DOCUMENTS 3,696,891 A * 10/1972 Poe ............................ 188/268

FOREIGN PATENT DOCUMENTS

| DE | 236 134 | 7/1911 |
|----|---------|--------|
| DE | 850 103 | 9/1952 |
| DE | 1 117 946 | 11/1961 |
| GB | 17310 | 11/1916 |

* cited by examiner

*Primary Examiner*—Richard W L Ridley
*Assistant Examiner*—Terence Boes
(74) *Attorney, Agent, or Firm*—Laurence A. Greenberg; Werner H. Stemer; Ralph E. Locher

(57) ABSTRACT

An apparatus for enabling relative adjustment of two parts has, on the first part, a chamber filled with balls. The second part engages between the balls, by which it is held fast to the first part. For adjustment of the two portions, the chamber volume can be increased in size in such a way that the second portion can be moved with rearrangement of the balls.

9 Claims, 3 Drawing Sheets

APPARATUS FOR THE RELATIVE ADJUSTMENT OF TWO PARTS

BACKGROUND OF THE INVENTION

1. Field of the Invention

The invention relates to an apparatus for the relative adjustment of two parts.

2. Description of the Related Art

For the purposes of fixing two parts which are movable relative to each other, the usual procedure is for securing elements to be fitted into and fixed in corresponding bores. If the connections are to be releasable again, suitable securing elements are selected, for example screws which can be unscrewed from a screw-threaded bore or from which a screw nut can be removed. Securing becomes more complicated if the two parts are to be fixed relative to each other in different positions, in particular when at least a quasi-stepless selection of securing positions is to be possible. For the purposes of securing the parts in different positions, at least one further bore or the like is required and the securing element can then be fitted selectively into one of the bores. If the desired positions are too close together, then under some circumstances a relatively large number of bores are required, which are at different spacings and which are for example provided in rows in mutually juxtaposed relationship.

German patent DE 850 103 discloses a possible way of securing two parts in any positions. In that case the one part has two or three screws with a pointed end, and the other part is provided in a similar manner to a saw blade with teeth, the flanks of which are at the same inclination as the tips of the screws. The spacing between the screws does not correspond to that of the teeth so that the screws can always be so fitted that they bear against a left and a right tooth flank. In that situation they generally penetrate between the teeth to differing depths.

The use of balls for bracing two parts, for example a workpiece which is longitudinally displaceable in a workpiece receiving means, is known from German published, prosecuted patent application DE 11 17 946. The workpiece is entirely or partially surrounded by balls (or rollers) which in the loosened condition are arranged in a zig-zag shape. One of the upstanding balls is depressed by means of a lever for fixing in the desired position so that all balls are wedged tight in the space between the two parts.

German patent DE 236 134 discloses an apparatus for centering a disc or the like on a shaft, the bore in the disc being larger than the shaft diameter. The shaft has radial bores, in which are provided balls which can be displaced outwardly by means of an axial tapered pin. When the disc is centered by the balls it is braced between two adjustable flanges.

SUMMARY OF THE INVENTION

It is accordingly an object of the invention to provide an apparatus for the relative adjustment of two parts which overcomes the disadvantages of the heretofore-known devices and methods of this general type.

With the foregoing and other objects in view there is provided, in accordance with the invention, an apparatus for the relative adjustment of a first part and a second part. The apparatus comprises a chamber and a plurality of balls disposed in the chamber. The balls engage the second part therebetween and hold the second part fast to the first part. The chamber has an adjustable volume and the volume of the chamber is increased to enable the second part to be moved and the balls to thereby be rearranged.

In other words, the invention proposes an apparatus in which the first part defines a chamber filled with balls, between which the second part engages and by which it is held fast to the first part, wherein for adjustment of the two parts the chamber volume can be increased in such a way that the second part can be moved with rearrangement of the balls.

In that way the second part can be fixed in virtually any position within the adjustment range by the volume of the chamber being reduced again to such an extent that no movement of the second part or the balls is then possible. In that situation the balls arrange themselves around the second part disposed between them, until the packing that is densest for the respective position is achieved. The second part is therefore held in positively locking relationship against further displacement.

In accordance with a preferred embodiment of the invention, the balls are provided in a single layer. Accordingly the height of the chamber corresponds to the diameter of the balls. As preferably a boundary wall of the chamber is adjusted for increasing the chamber volume, the adjustable boundary wall, particularly when there is only a single layer of balls, extends preferably parallel to the layer of balls and thus forms a cover for the chamber. It has been found that raising the boundary wall by approximately a quarter of the ball diameter already suffices to provide that, upon displacement of the second part in the plane of the layer of balls, deflection of a sufficient number of balls out of the layer thereof is possible.

Preferably the adjustable boundary wall is arranged on the second part displaceably in perpendicular relationship to the layer of balls. As, in that embodiment, upon adjustment of the second part after the increase in the chamber volume, the boundary wall also moves with the second part, it projects beyond the chamber on all sides as even in a maximum adjustment position it must cover the layer of balls at the oppositely disposed edge.

In many situations of use, for example in the case of an adjustable steering column of a motor vehicle, the second part which in this example supports the steering column passes through the fixed first part (fixed with respect to the bodywork) and in a further embodiment it is preferably provided that the boundary wall which is parallel to the adjustable boundary wall, that is to say the bottom of the chamber, is connected to the second part. In this embodiment the boundary walls of the chamber, which belong to the first part, represent a frame for the layer of balls, which frame is displaced within the bottom and the openable cover.

In principle it is also possible to displace at least one of the lateral boundary walls of the chamber, to pull out an element which engages into the layer of balls, or to reduce the cross-section of the second part, and that also provides a free space for the movement of the second part and the displacement of the balls.

If the second part is of a bar-like or tubular configuration, it is possible to associate with the adjustable boundary wall a guide sleeve which is axially displaceable on the second part. If the guide sleeve and the second part are provided with female and male screwthreads or form a bayonet fastening or the like, the guide sleeve can be provided with a handle which is for example pivotable between two abutments.

The second part may be displaced not only in parallel relationship with the layer of balls in two directions but also perpendicularly thereto, and can be held in positively locking relationship, if the second part has grooves at the periphery and is axially displaceable in a tubular portion which in the region of the layer of balls has openings for balls to pass through into the grooves. The non-displaceable boundary wall of the chamber is arranged on the tubular portion and the guide sleeve of the adjustable boundary wall is supported longitudinally displaceably on the tubular portion. When the volume of the chamber is increased then in this embodiment the balls which engage through the openings into the grooves in the second part come out of the grooves so that the second part can be displaced axially in the tubular portion into the desired position. When the volume of the chamber is reduced again, the balls again pass through the openings into the peripheral grooves in the second part and hold it fixedly. In this embodiment the guide sleeve or an adjusting ring acting on the guide sleeve is advantageously provided with a handle.

The apparatus according to the invention can be used for a large number of adjusting devices. Use for three-dimensional adjustment of a motor vehicle steering column has already been mentioned hereinbefore and the invention is also described hereinafter in relation to an apparatus which is suitable for a motor vehicle steering column which is adjustable in respect of length, inclination and lateral orientation, without being restricted thereto.

The apparatus according to the invention can be used for the three-dimensional fixing of any components which cannot all be listed. In particular it represents a simple structure wherever a choice is to be made between a plurality of basic positions, between which in particular adjustment is to be effected only on occasions or between which fine adjustment is to be made possible. It can equally be used for the seat adjustment of motor vehicle seats, for height adjustment of the legs of articles of furniture, for all-around pivotal movement of a lighting unit and so forth.

Other features which are considered as characteristic for the invention are set forth in the appended claims.

Although the invention is illustrated and described herein as embodied in an apparatus for the relative adjustment of two parts, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENTS

Figure 1:
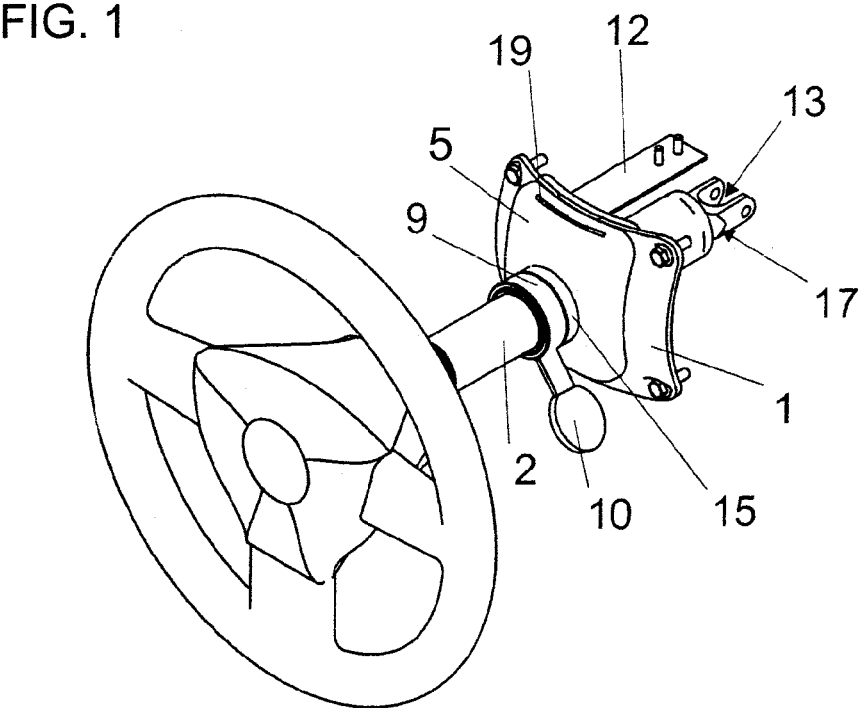
FIG. 1 is a perspective view of a steering column with an apparatus according to the invention.

Referring now to the figures of the drawing in detail and first, particularly, to FIG. 1 thereof, there is seen a steering column 17 of a motor vehicle with two tubular portions that are telescopically displaceable one within the other. The column is also adjustable in respect to an inclination and also laterally by virtue of a universal joint 13. A first part 1 of the adjusting apparatus according to the invention, in the form of a curved plate which has an opening, is fixed to the bodywork.

Figure 2:
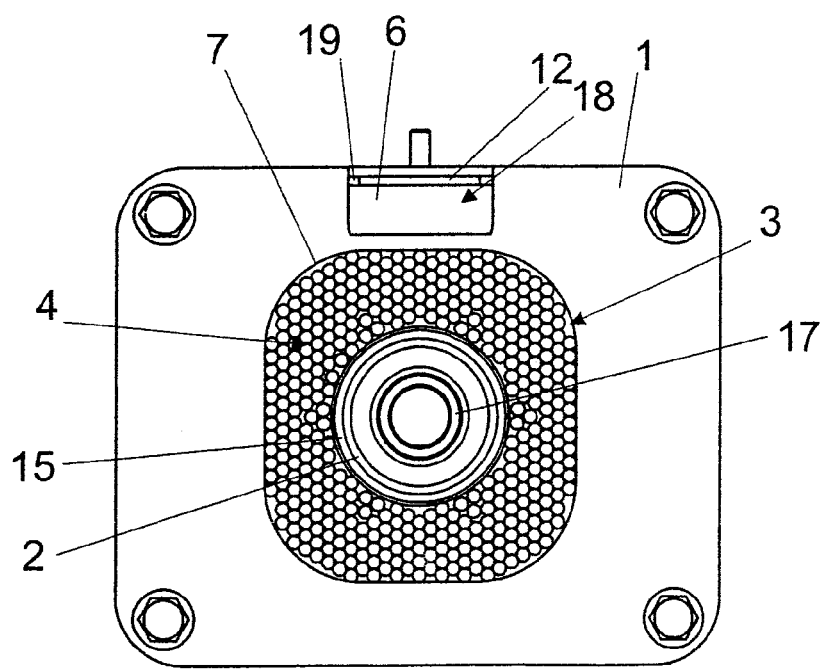
FIG. 2 is a front view without an adjustable boundary wall.
Figure 3:
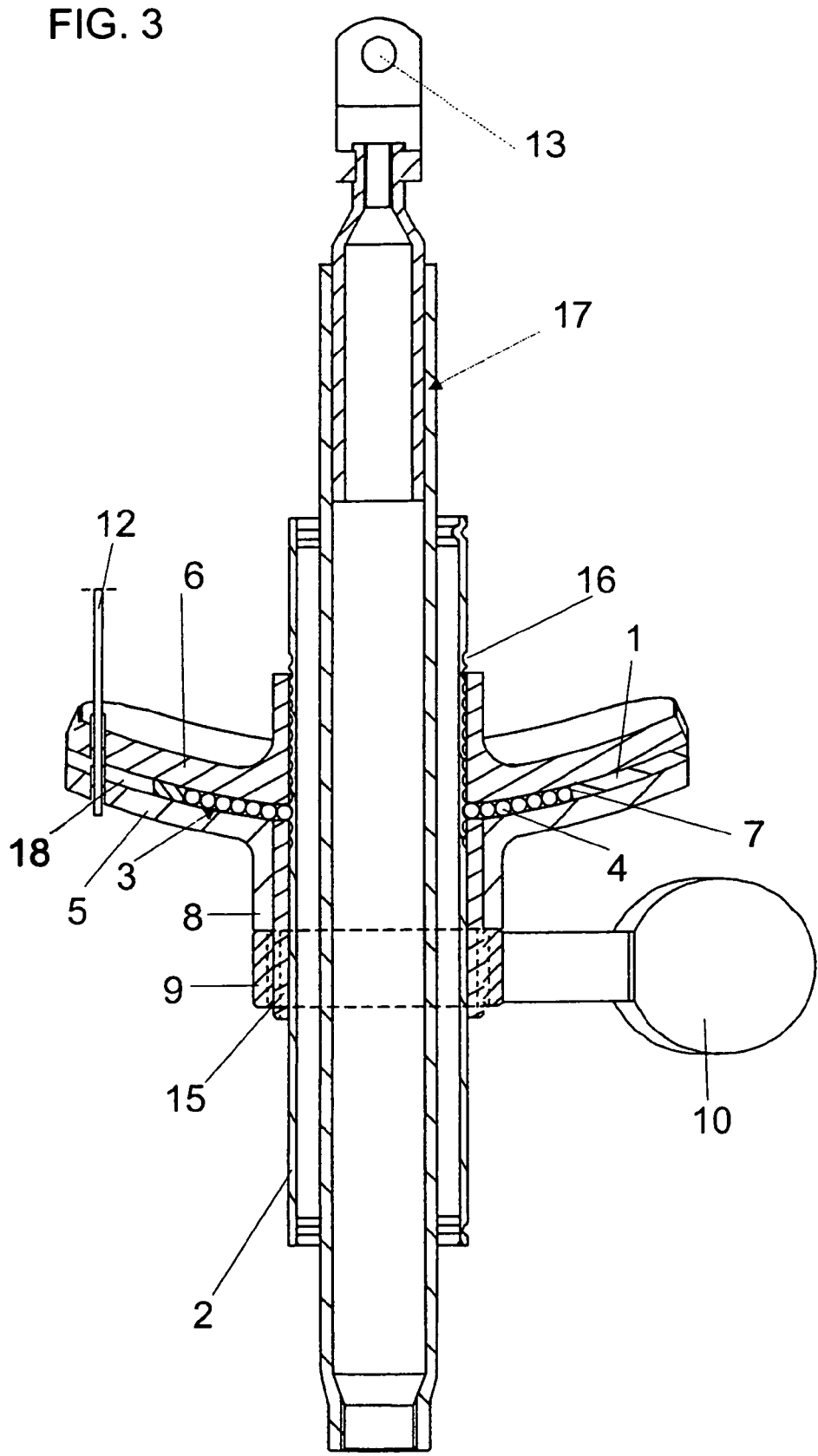
FIG. 3 is a view on an enlarged scale in longitudinal section in the fixing position.

The edges 7 defining the opening can be seen in FIG. 2. The edges 7 and the two mutually parallel walls 5, 6 define a chamber 3 (FIGS. 3 and 4) through which passes the second part 2 of the adjusting apparatus, in which part the steering column 17 is rotatably supported. The second part 2 is arranged axially displaceably in a tubular portion 15 having openings 11 therethrough, and has continuous or displaced grooves 16 at the periphery. As can be seen from FIG. 2 the chamber 3 is filled with a layer 4 of balls, wherein some of the balls, as FIG. 3 shows, engage through the openings 11 into the grooves 16 in the second part 2. The densely packed layer 4 of balls prevents displacement of the second part in all three directions as long as the chamber 3 is closed on all sides and is at its smallest volume (FIG. 3).

For adjustment of the second part 2 the volume of the chamber 3 is increased in size so that a sufficient number of balls in the layer 4 can be rearranged and a free space 14 for movement is provided for the second part between the balls.

Figure 4:
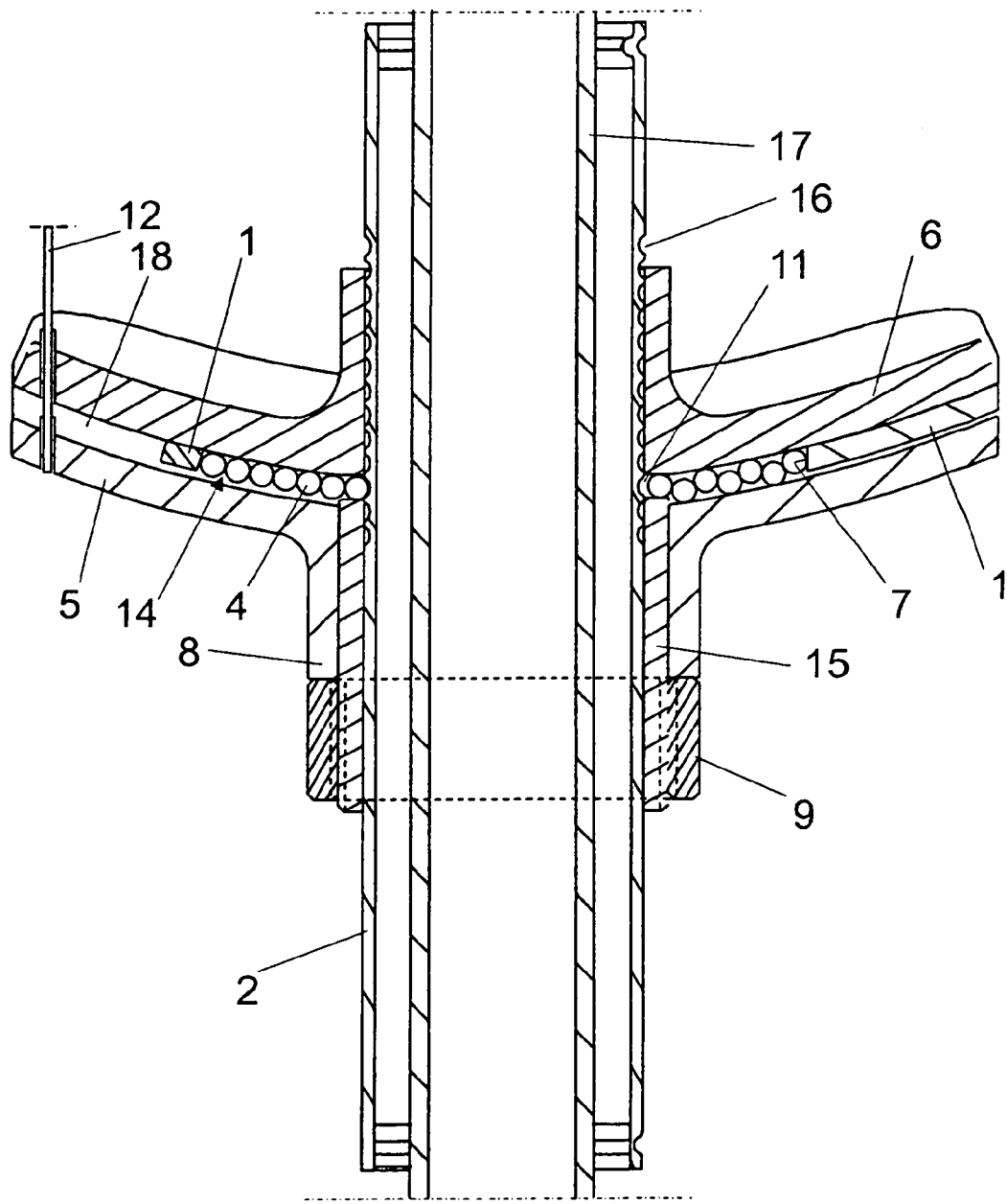
FIG. 4 is a view on an enlarged scale in longitudinal section in the adjusting position.

To provide for the increase in volume, in particular the boundary wall 5 which forms a cover is lifted. At the left-hand side FIG. 4 shows the balls of the layer 4 in the fixing position in which the innermost ball is disposed in a groove 16 in the second part. At the right-hand side in FIG. 4 the balls have been displaced and the innermost ball has come out of the groove 16. The steering column 17 can now be displaced axially over the region of the part 2, which is provided with grooves 16, and it can be pivoted about the joint 13, in which case for example adjustment of the angle of inclination is effected in FIGS. 3 and 4 by pivotal movement in the plane of the drawing.

When the desired position is reached the chamber 3 is reduced in size again so that the balls are again transferred into the condition of densest packing and block any displacement of the second part 2.

For the lifting and lowering movement of the displaceable boundary wall 5 it is arranged on a guide sleeve 8 which is axially displaceable on the tubular portion 15. The tubular portion 15 carries the boundary wall 6 forming the bottom of the chamber 3. The tubular portion 15 can have for example a screwthread or a rising sliding guide path on which the guide sleeve 8 or an adjusting ring 9 associated therewith is rotatable. A handle 10 can be provided for greater ease of handling. In the closed position of the chamber 3 (FIG. 3) the boundary wall 6 fixed to the tubular portion 15 is at the inside and the boundary wall 5 which is adjustable on the tubular portion 15 is on the outside of the plate-shaped first part 1. The thickness of the first part 1 and thus the height of the chamber corresponds to the diameter of the balls. Upon adjustment of the second part 2 in parallel relationship with the layer 4 of balls, the two boundary walls 5, 6 also move with the second part 2 and therefore project beyond the respective edges 7 of the first part 1 at least by the adjustment travel of the second part 2 as the layer 4 of balls must always be covered. By virtue of the pivotal movement in the universal joint 13 the first part 1 and the two boundary walls 5 and 6 are corresponding spherically curved surfaces.

In order to secure the second part 2 to prevent rotational movement thereof upon rotation of the steering column 17, a rotation-preventing means can be provided in the form of a key element 12 which is fixed with respect to the bodywork and which passes through slots 19 in the boundary walls 5 and 6 and an opening 18, as is diagrammatically shown in FIGS. 1 and 2.

The balls are in particular steel balls as are used for ball bearing assemblies, plastic balls can optionally also be used. At the side facing towards the layer of balls 4 the adjustable boundary wall 5 could have a sound-damping layer or coating of rubber or the like in order to avoid vibration noises. The closed position of the adjustable boundary wall 5 can possibly also be spring-loaded, for example by a plate spring or the like which is fitted between the guide sleeve 8 and the adjusting ring 9.

This application claims the benefit, under 35 U.S.C. § 119, of European patent application 05011993.2, filed Jun. 3, 2005; the disclosure of the prior application is herewith incorporated by reference in its entirety.

I claim:

1. An apparatus for the relative adjustment of a first part and a second part, the apparatus comprising:
    a plurality of balls disposed in a chamber and substantially filling said chamber;
    said chamber having an adjustable volume with a reduced volume position in which said balls are substantially arrested and an increased volume position in which said balls are enabled to be rearranged;
    said balls engaging said second part therebetween and holding said second part fast to the first part in the reduced volume position of said chamber; and
    wherein, when said volume of said chamber is increased to an increased volume position, the second part is enabled to be moved in a lateral direction of said second part and said balls to thereby be rearranged said balls are disposed in a single layer of balls;
    said chamber having a first boundary wall extending parallel to said layer of balls and at least said first boundary wall is adjustable for increasing said volume of said chamber; and
    said chamber further formed with a second boundary wall, the second part passing through the first part and through said second boundary wall, said second boundary wall disposed on the first part parallel to said first adjustable boundary wall, and said first and second boundary walls are commonly movable parallel to said layer of balls when the second part is being moved.

2. The apparatus according to claim 1, wherein said chamber has a first boundary wall and at least said first boundary wall is adjustable for increasing said volume of said chamber.

3. The apparatus according to claim 1, wherein said first adjustable boundary wall is disposed on the second part displaceably in a direction perpendicular to said layer of balls.

4. The apparatus according to claim 3, wherein the second part is configured as a rod-shaped or tubular element.

5. The apparatus according to claim 4, wherein the second part is formed with a male screwthread and an adjusting ring adjoining said first adjustable boundary wall is formed with a female screwthread.

6. The apparatus according to claim 5, wherein said adjusting ring is formed with a handle.

7. An apparatus for the relative adjustment of a first part and a second part, the apparatus comprising;
    a plurality of balls disposed in a chamber and substantially filling said chamber;
    said chamber having an adjustable volume with a reduced volume position in which said balls are substantially arrested and an increased volume position in which said balls are enabled to be rearranged;
    said balls engaging said second part therebetween and holding said second part fast to the first part in the reduced volume position of said chamber;
    wherein, when said volume of said chamber is increased to an increased volume position, the second part is enabled to be moved in a lateral direction of said second part and said balls to thereby be rearranged said chamber is formed with a boundary wall and a tubular portion connected to said boundary wall and passing through said balls, wherein said tubular portion is formed with openings, and the second part is a rod-shaped or tubular element that is axially displaceable in said tubular portion, and said second part has a periphery formed with grooves and said balls pass through said openings into said grooves; and
    said chamber is formed with a first adjustable boundary wall, said tubular portion has a male screwthread, and an adjusting ring adjoining said first adjustable boundary wall is formed with a female screwthread.

8. The apparatus according to claim 7, wherein said adjusting ring is formed with a handle.

9. The apparatus according to claim 7, the apparatus is configured for adjusting a telescopic steering column of a motor vehicle articulated about a universal joint, wherein said first part is a curved plate fixedly mounted to the body of the motor vehicle and being formed with an opening, wherein the steering column is rotatably mounted within said second part and said tubular portion projects through said opening formed in said curved plate, and wherein said volume is defined by curved walls covering said opening in said curved plate and being laterally movable relative to said curved plate together with the tubular portion.

* * * * *